United States Patent Office 3,478,413
Patented Nov. 18, 1969

3,478,413
ALUMINIDE COATING BRAZE STOP-OFF
John D. Gadd, Willowick, Ohio, assignor to TRW Inc., Cleveland, Ohio, a corporation of Ohio
No Drawing. Filed May 9, 1966, Ser. No. 548,423
Int. Cl. C23c 1/08; B23k 1/20
U.S. Cl. 29—490         5 Claims

ABSTRACT OF THE DISCLOSURE

A method of brazing in which a stop-off is provided by applying aluminum particles over the stop-off area, heat treating the particles to cause diffusion of aluminum into the article resulting in the production of a metal aluminide layer, and then oxidizing the aluminide layer to provide an exterior surface of an oxide which is metallurgically bonded to the area by the intermediate aluminide layer.

---

The present invention relates to the brazing of articles composed of alloys in which the base metal, i.e., the predominating metal, is a metal of the iron group (iron, cobalt, or nickel).

In the brazing of alloys of iron group metals, it is common practice to provide a stop-off consisting of an oxide of chromium or aluminum in the areas in which the brazing alloy is not desired. These oxides are frequently fired onto the stop-off area, or they may be flame sprayed in that area. In either case, the oxide layers are quite porous and are only mechanically bonded to the substrate material. Consequently, they tend to spall off or are undercut by the brazing alloy during the brazing cycle.

One of the objects of the present invention is to provide a stop-off structure for the brazing of alloys based on an iron group metal which effectively resists the flow of brazing alloys during the brazing operation.

A further object of the invention is to proving a method for providing a stop-off which is metallurgically bonded to the underlying metal and which includes a dense intermediate non-porous layer.

A further object of the invention is to provide an improved brazed article utilizing a stop-off at the brazed union which effectively resists penetration by the brazing alloy.

In accordance with the method of the present invention, the stop-off composition is provided by applying a suspension of aluminum particles over the area concerned, followed by heat treating the particles in a non-oxidizing atmosphere to cause diffusion of aluminum into the article and the production of a metal aluminide layer. This is followed by superficially oxidizing the aluminide layer to provide an exterior surface of an oxide thereon metalurigcally bonded to the area by the intermediate aluminide layer. The oxidized layer and the aluminide layers can be left on or removed after brazing by mechanical abrading means such as sanding or blasting or by machining.

Metals of the iron group, namely, iron, nickel and cobalt, are capable of forming intermetallic compounds with aluminum, such compounds consisting to a large extent of the intermetallic MAl, where M is the iron group metal, and they also contain the compound $M_3Al$. The aluminide layer thus produced is dense and imperforate, providing an ideal substrate for the superficial oxide layer at the surface.

The invention is particularly applicable to the brazing of heat resistant alloys of iron, nickel and cobalt including the so-called "superalloys." While the chemistry of these alloys may vary widely and still be useful for the purposes of the present invention, the following table lists nickel, cobalt, and iron based alloys which can be provided with the improved stop-off of thep resent invention:

AISI 321 stainless:
 0.08 max. C
 2.0 max. Mn
 1.0 max. Si
 18 Cr
 10 Ni
 5× C min. Ti
 Bal. Fe
AISI 310 stainless:
 0.25 max. C
 2.0 max. Mn
 1.5 max. Si
 25 Cr
 20 Ni
 Bal. Fe
"Nimonic 90":
 0.1 max. C
 1.0 max. Mn
 1.0 max. Si
 20 Cr
 18 Co
 2.5 Ti
 1.5 Al
 5.0 max. Fe
 Bal. Ni
"Hastelloy X":
 0.15 C
 22 Cr
 9 Mo
 20 Fe
 Bal. Ni
"Inconel 700":
 0.13 C
 0.08 Mn
 0.25 Si
 15 Cr
 30 Co
 3 Mo
 2.2 Ti
 3.2 Al
 1 Fe
 Bal. Ni
"Waspaloy":
 0.1 C
 19 Cr
 14 Co
 4 Mo
 3 Ti
 1.3 Al
 1 Fe
 Bal. Ni
"Udimet 500"
 0.1 C
 19 Cr
 19 Co
 4 Mo
 3 Ti
 2.9 Al
 4 max. Fe
 Bal. Ni
"Udimet 700"
 0.1 C
 15 Cr
 19 Co
 5 Mo
 3.5 Ti
 4.5 Al
 4 max. Fe
 0.03 B
 Bal. Ni
"L-605"
 0.15 C
 1.5 Mn
 0.5 Si
 20 Cr
 10 Ni
 15 W
 2 Fe
 Bal. Co
"S-816"
 0.40 C
 1.2 Mn
 0.4 Si
 20 Cr
 20 Ni
 4 Mo
 4 W
 4 Cb
 4 Fe
 Bal. Co
"V-36"
 0.25 C
 1.0 Mn
 0.4 Si
 25 Cr
 20 Ni
 4 Mo
 2 W
 2 Cb
 3 Fe
 Bal. Co The aluminum particles, preferably of a size of about −325 mesh, are applied as a dispersion to the surface where the stop-off is to appear. Typically, the aluminum particles can be sprayed on utilizing a binder such as a nitrocellulose lacquer or polyisobutylene. Alternatively, the article to be brazed can be coated with aluminum particle dispersion by dipping or by painting. Only the areas in which the stop-off is to be formed are given the coating of aluminum, the others being masked Next, the coated article is heat treated under nonoxidizing conditions for a time sufficient to cause the production of an aluminide on the surface. The heat treatment is preferably carried out either in a vacuum of less than 1 micron or in the presence of a non-oxidizing gas such as hydrogen, argon, helium, neon, and the like. Temperatures ranging from just above 1220° F. up to just under the melting point of the alloy are appropriate for this stage, the time of treatment of course varying with the temperature. At the preferred temperature range of 1800 to 2000° F., treatment times may extend from ½ to 1 hour.

The amount of diffusion of aluminum into the underlying substrate varies both with the composition of the base metal and the time of treatment. Aluminum, for example, diffuses more rapidly in chromium stainless steel than in materials containing nickel or cobalt. Normally, however, the treatment will be continued until an intermetallic aluminide layer measuring from about ½ to 3 mils in thickness is produced at the surface of the alloy.

Following the heat treatment, the aluminide coating is superficially oxidized in an oxidizing atmosphere, typically at a temperature of 1200° F. for a period of 1 hour. The oxide surface film which results provides a stop-off to the molten braze alloy, and the underlying aluminide layer provides a secure metallurgical bond between the base metal and the superficial oxide coating. The density and continuity of the oxide film produced in this manner provides a considerably more effective stop-off than the commercially used oxide stop-off materials.

The following specific example illustrates the manner in which the stop-off layer of the present invention can be produced.

EXAMPLE

An aluminum-lacquer slurry was made up containing 100 grams of pure aluminum powder (—325 mesh) and 315 cc. of nitrocellulose lacquer. A 3 to 5 mil thickness slurry bisque was spray deposited on the surface to be coated, while the slurry was excluded from all other areas by masking. The green bisque was heat treated in a vacuum for ½ hour at 1800° F., to produce a nickel aluminide coating of 1 to 2 mils in thickness over the nickel superalloy base. The aluminide coating was then oxidized for 1 hour at 1200° F. to provide an oxide surface film composed substantially of aluminum oxide. This stop-off was found to be completely effective in restricting the flow of a nickel-gold-palladium braze alloy during the brazing of the nickel base superalloy.

It should be evident that various modifications can be made to the described embodiments without departing from the scope of the present invention.

I claim as my invention:

1. In a method of brazing an article composed of an alloy having a base metal of the iron group to another article by the interposition of a brazing alloy between the surfaces of the articles to be joined while preventing migration of said brazing alloy to an area adjoining the brazed union, the improvement which comprises applying a suspension of aluminum particles over said area, heat treating the particles in a non-oxidizing atmosphere to cause diffusion of aluminum into said article and the production of a metal aluminide layer, heating said aluminide layer in an oxidizing atmosphere to provide an exterior surface of an oxide thereon metallurgically bonded to said area by the intermediate aluminide layer, and thereafter brazing said articles together.

2. The method of claim 1 in which the heat treatment is carried out at a temperature above 1220° F. but below the melting point of said alloy.

3. The method of claim 1 in which the heat treating is carried out at a temperature in the range from 1800 to 2000° F.

4. The method of claim 1 in which the heat treatment is carried out under vacuum conditions.

5. The method of claim 1 in which the heat treatment is carried out in a hydrogen atmosphere.

References Cited

UNITED STATES PATENTS 2,927,043    3/1960    Stetson _____ 117—22 X
3,110,102   11/1963    Pfefferkorn _____ 106—2

RALPH S. KENDALL, Primary Examiner

U.S. Cl. X.R.

106—2; 117—5.5, 22; 148—6.3